UNITED STATES PATENT OFFICE.

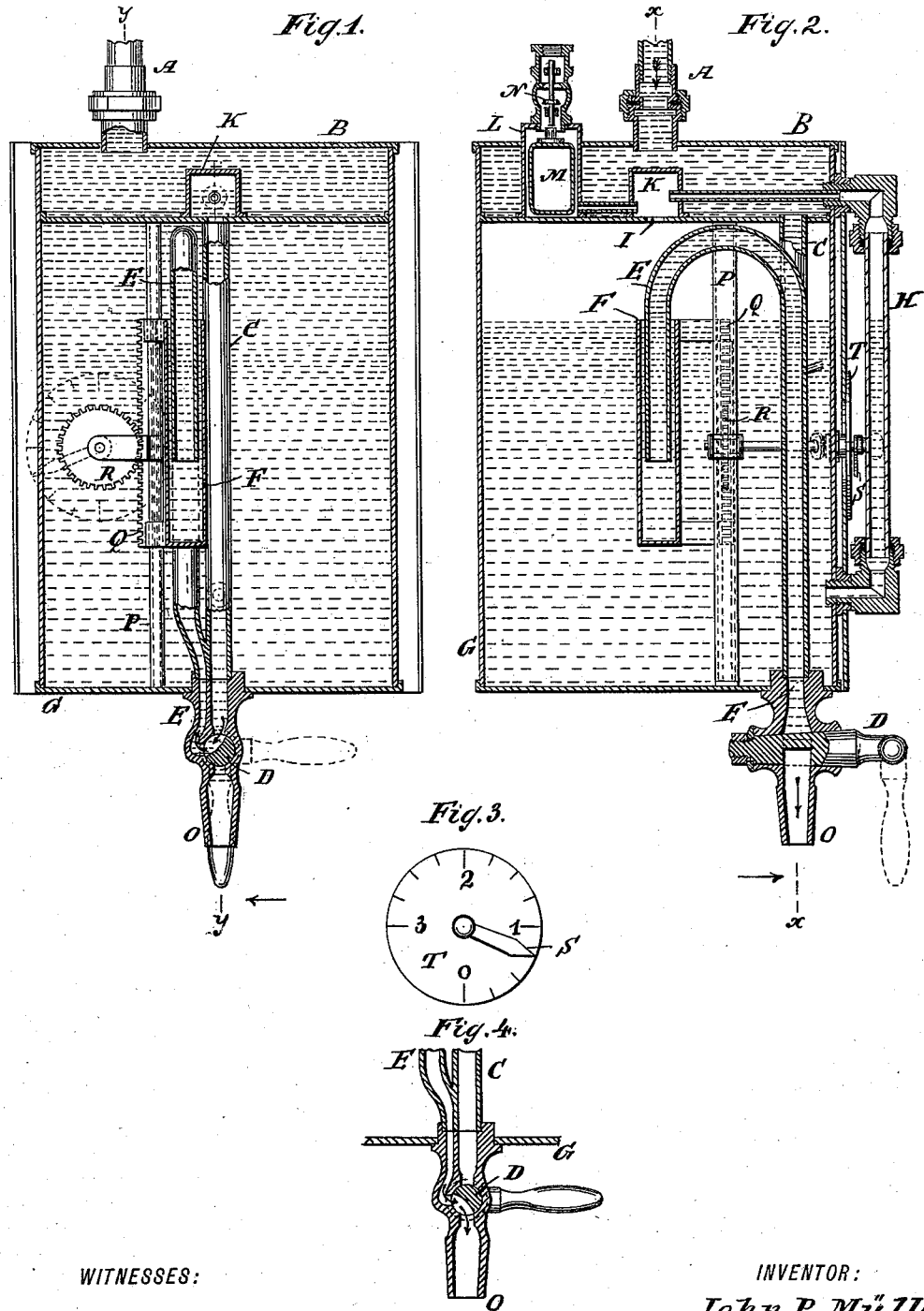

JOHN P. MÜLLER, OF BROOKLYN, NEW YORK, ASSIGNOR TO THE MÜLLER AUTOMATIC LIQUID METRE MANUFACTURING COMPANY, OF SAME PLACE.

MEASURING-VESSEL FOR LIQUIDS.

SPECIFICATION forming part of Letters Patent No. 417,576, dated December 17, 1889.

Application filed April 6, 1889. Serial No. 306,215. (No model.) Patented in Germany August 16, 1887, No. 45,332.

*To all whom it may concern:*

Be it known that I, JOHN P. MÜLLER, a citizen of the United States, residing at Brooklyn, in the county of Kings and State of New York, have invented new and useful Improvements in Measuring Devices for Liquids, (for which I have obtained Letters Patent in Germany, dated August 16, 1887, No. 45,332,) of which the following is a specification.

This invention relates to a device which enables a rapid and accurate drawing of a certain quantity of liquid, as set forth in the following specification and claims and illustrated in the accompanying drawings, in which—

Figure 1 is a transverse section of a measuring device along line $x\,x$, Fig. 2. Fig. 2 is a section along $y\,y$, Fig. 1. Fig. 3 is a detail view of an index. Fig. 4 is a detail sectional view of a cock.

Similar letters indicate corresponding parts.

In the drawings, the letter A indicates a feed-pipe for carrying a liquid from a suitable tank to the chamber B, from whence said liquid enters a pipe C, having a cock D. When this cock is in the position shown in Fig. 1, the liquid from pipe C passes through the discharge-pipe E into the cup F, and, overflowing into the vessel G, said vessel with its sight-glass H are also filled. After filling the vessel G the liquid passes through opening I into chamber K and thence to chamber L, so as to raise the float M and close the valve N, when the further escape of air from the chamber L is prevented and the flow of liquid through feed-pipe A is therefore stopped. The chamber K communicates with the sight-glass H and the chamber L.

When the vessel G is filled, as seen in Fig. 1, the cock D is moved to the position shown in Fig. 4, thus cutting off the communication between pipes C and E and bringing pipe E into communication with the outlet O. Liquid from the vessel G then flows out through discharge-pipe E and outlet O until the liquid in vessel G has reached the mouth of cup F, when the liquid flows out of cup F until the liquid in the cup has passed the mouth of pipe E in said cup, when the flow of liquid through pipe E and outlet O stops.

The cup F is adjustable in the vessel G, so that by regulating the position of said cup the discharge of liquid from vessel G can be cut off, according as a greater or less quantity of liquid has been drawn from vessel G. Said cup F is shown adjustable along a support P, and a rack Q and gear-wheel R, Fig. 1, enable said cup to be adjusted from the outside of vessel G, the shaft or wheel R being made to pass out through a suitable stuffing-box in the side of vessel G. By providing the shaft of wheel R with an index S, adapted to move over a dial T, the position of cup F can be adjusted so as to draw from the vessel G a given quantity of liquid.

The discharge-pipe E is shown in form of a siphon, the short leg of which enters the cup F and the long leg of which passes to the outlet O.

What I claim as new, and desire to secure by Letters Patent, is—

1. The combination, with a measuring-vessel, of a cup adjustably secured within said vessel, a siphon discharge-pipe communicating with said cup, and an index for showing the adjustment of said cup, substantially as described.

2. The combination, with a measuring-vessel having an outlet O and a feed-pipe C for said vessel, of a cup adjustably secured within said vessel, a discharge-pipe E, communicating with said cup, and a cock for putting the discharge-pipe into communication with the feed-pipe and the outlet, substantially as described.

3. The combination, with a measuring-vessel having an outlet O, of a cup adjustably secured within said vessel, and a discharge-pipe made in form of a siphon, the shorter leg of which communicates with said cup and the longer leg of which communicates with the outlet, substantially as described.

In testimony whereof I have hereunto set my hand in the presence of two subscribing witnesses.

JOHN P. MÜLLER.

Witnesses:
WM. L. VAN DERZEE,
WILLIAM C. HAUFF.